US012402597B2

(12) United States Patent
Yagi (10) Patent No.: US 12,402,597 B2
(45) Date of Patent: Sep. 2, 2025

(54) SNAKE HIBERNACULA

(71) Applicant: 8Trees Inc., Fonthill (CA)

(72) Inventor: Anne Yagi, Fonthill (CA)

(73) Assignee: 8 Trees Inc., Fonthill (CA)

( * ) Notice: Subject to any disclaimer, the term of this patent is extended or adjusted under 35 U.S.C. 154(b) by 30 days.

(21) Appl. No.: 18/236,692

(22) Filed: Aug. 22, 2023

(65) Prior Publication Data

US 2025/0064014 A1    Feb. 27, 2025

(51) Int. Cl.
*A01K 1/02* (2006.01)

(52) U.S. Cl.
CPC ..................... *A01K 1/02* (2013.01)

(58) Field of Classification Search
CPC .............. A01K 1/02; A01K 7/02; A01K 1/00
USPC ......................................................... 119/486
See application file for complete search history.

(56) References Cited

U.S. PATENT DOCUMENTS

| | | | | |
|---|---|---|---|---|
| 1,851,188 | A * | 3/1932 | Kibble .................. | A01K 31/22 119/486 |
| 2,358,588 | A * | 9/1944 | Palmer .................. | A01K 1/035 119/486 |
| 2,795,208 | A * | 6/1957 | Rasmussen ............. | A01K 1/03 119/486 |
| 6,675,740 | B1 * | 1/2004 | Payne ..................... | A01K 1/03 119/482 |
| 2025/0064014 | A1 * | 2/2025 | Yagi ....................... | A01K 1/02 |

OTHER PUBLICATIONS

Todd, J., Ameil, J., & Wassersug, R. 2009. Factors influencing the emergence of a northern population of Easter Ribbon Snakes (*Thamnophis sauritus*) from artificial hibemacula. Canadian Journal of Zoology, 1121-1126. ("Todd").
Mataya et al., Snake Hibernacula Monitoring Report. 2015. Apr. 22, 2025, pp. 1-45 ("Mataya").
Toronto Zoo. Snake Hibernacula. Online, Toronto Zoo: http://www.torontozoo.com/adoptapond/snakehibemacula.asp., May 18, 2023, pp. 1-3 ("TorontoZoo").
Zappalorti et al. Artificial Refugia as a Habitat-Improvement Strategy for Snake Conservation, Contributions to Herpetology, vol. 11, pp. 369-375, 1994. ("Zappalorti").
Gray, Brian S., Artificial Hibernation of Some Temperate North American Snakes, Bull. Chicago Herp. Soc. 41(6):101-105, 2006 ("Gray").

(Continued)

*Primary Examiner* — Monica L Perry
*Assistant Examiner* — Maria E Graber
(74) *Attorney, Agent, or Firm* — Smart & Biggar LP (57) ABSTRACT

A communal snake hibernaculum, including a communal chamber having a lower end below a ground level at a hibernaculum site with a water zone at the lower end to hold rehydration water and a snake hibernaculum life zone above the water zone. The communal chamber has a snake entrance providing snake access to the life zone and includes snake support shelves within the communal chamber at a plurality of vertically-spaced locations, the snake support shelves including at least one shelf in the life zone. A water outlet opens through a sidewall of the communal chamber above the lower end of the communal chamber and below the life zone to prevent flooding of the life zone, and the sidewall is a wall of a container installed at the hibernaculum site.

19 Claims, 9 Drawing Sheets

(56) References Cited

OTHER PUBLICATIONS

Costanzo, J. P. 1985. The bioenergetics of hibernation in the Eastern Gartersnake *Thamnophis sirtalis sirtalis*. Physiological Zoology 58: 682-692("Costanzo1985").

Costanzo, J. P. 1986. Influences of hibernaculum microenvironment on the winter life history of the garter snake (*Thamnophis sirtalis*). Ohio Journal of Science 86:199-204 ("Costanzo1986").

Costanzo, J. P. 1989a. A physiological basis for prolonged submergence in hibernating gartersnakes *Thamnophis sirtalis*: evidence for an energy-sparing adaptation. Physiology of Zoology 62:580-592. ("Costanzo1989a").

Costanzo, J. P. 1989b. Effects of humidity, temperature, and submergence behaviour on survivorship and energy use in hibernating gartersnakes, *Thamnophis sirtalis*. Canadian Journal of Zoology 67:2486-2492. ("Costanzo1989b").

Ontario Ministry of Natural Resources and Forestry. 2018. Best Management Practices for Identifying, Managing and Creating Habitat for Ontario's Species at Risk Snakes. 2018. ontario.ca/speciesatrisk. 85pp. ("Ontario").

Yagi et al. (2012) Identification, Characterization and Subterranean Delineation of Critical Eastern Massasauga Hibernation Habitat in a Partially Mined Peatland for the Purposes of Species Recovery, Poster Ontario Nature Conference, Toronto 2012("Yagi2012").

Yagi, A. R. 2020. Flood survival strategies of overwintering snakes. MSc. Thesis Brock University, St Catharines, Canada. ("YAGIFloodSurvival").

Yagi et al. 2020. A long-term study on Massasaugas (*Sistrurus catenatus*) Inhabiting a partially mined peatland: A standard method to characterize snake overwintering habitat. Journal of Herpetology, 54: 235-244.("Yagi2020").

\* cited by examiner

SNAKE HIBERNACULA

TECHNICAL FIELD

The disclosure relates to snake hibernacula, and particularly to in-ground snake hibernacula.

BACKGROUND

Snake overwintering survival in many areas requires a hibernaculum which provides the snake with a subterranean space that remains aerobic through the winter, does not freeze or flood completely, and is free of predators. Species and age differences result in different selections of overwintering positions, and many snakes are able to dive in water for at least short periods of time.

Snake hibernacula have been built which provide subterranean spaces for overwintering. However, snake hibernacula of the prior art may be inefficient or ineffective. Accordingly, there is a need for an improved snake hibernacula.

SUMMARY

According to some aspects, there is provided a communal snake hibernaculum, comprising a communal chamber installable at a hibernaculum site with a life zone within the chamber at a depth below a frost line and above a groundwater level, the communal chamber including a sidewall extending between a lower end and an opposing upper end with a water outlet opening through the sidewall between the lower end and the life zone to separate the life zone from a water zone at the lower end of the chamber and prevent flooding of the life zone when the communal chamber is installed at the hibernaculum site; a plurality of snake support shelves within the communal chamber at a plurality of positions spaced between the upper and lower ends of the chamber, including at least one snake support shelf within the life zone; and a snake entrance opening from an exterior of the communal snake hibernaculum into the communal chamber above the water outlet to provide snake access to the life zone.

In some examples, the water outlet includes a passage extending between an intake end opening through the sidewall and a discharge end, the passage provided to carry water away from the hibernaculum when installed at the hibernaculum site.

The communal snake hibernaculum may be installed at the hibernaculum site with the water outlet passage having an above-ground discharge end.

The communal snake hibernaculum may further comprise a water inlet opening into the communal chamber above the lower end of the communal chamber to supply water to fill the water zone.

The communal snake hibernaculum may be installed at the hibernaculum site with an intake end of the water inlet opening from a seasonally-available water supply to seasonally introduce new water to the communal chamber.

The communal snake hibernaculum may be installed at the hibernaculum site with the bottom end of the communal chamber extending below the ground level to a depth of at least 1 meter.

The communal snake hibernaculum may be installed at the hibernaculum site with the upper end above the ground level and insulated by an overburden.

At least a plurality of the snake support shelves may be formed by a plurality of blocks each having at least one internal cell opening through the block.

The communal chamber may be sized to hold a plurality of snakes and has a volume of at least 7,500 cubic centimeters.

The communal snake hibernaculum may be a multi-species hibernaculum and has a plurality of snake entrances including a first snake entrance sized for a first snake species and a second snake entrance sized for a second snake species, the first snake entrance being a different size than the second snake entrance.

The communal snake hibernaculum may further comprise a monitoring well extending into the chamber from an exterior of the communal snake hibernaculum.

According to some aspects, there is provided a communal snake hibernaculum, comprising a communal chamber having a lower end below a ground level at a hibernaculum site with a water zone at the lower end to hold rehydration water and a snake hibernaculum life zone above the water zone, the communal chamber having a snake entrance providing snake access to the life zone and including snake support shelves within the communal chamber at a plurality of vertically-spaced locations, the snake support shelves including at least one shelf in the life zone; and a water outlet opening through a sidewall of the communal chamber above the lower end of the communal chamber and below the life zone to prevent flooding of the life zone, and wherein the sidewall is a wall of a container installed at the hibernaculum site.

In some examples, the container further comprises a bottom wall, and the sidewall and bottom wall form the lower end below the ground level.

The container may be a plastic drum and the sidewall and bottom wall may be part of a unitary body.

The life zone may be above a groundwater level at the hibernaculum site.

The snake hibernaculum life zone may be at a depth that is below a frost line at the hibernaculum site.

According to some aspects, there is provided a method of constructing a communal snake hibernaculum, comprising installing a container at a hibernaculum site to form a communal chamber with a subterranean water zone at a lower end of the chamber to hold rehydration water and an additional zone above the water zone and positioned to ordinarily remain aerobic, above a water level in the communal chamber, and above freezing such that the additional zone is a snake hibernaculum life zone; forming at least one snake entrance opening into the communal chamber from an exterior of the communal snake hibernaculum to provide snake access to the life zone; forming a water outlet opening through a sidewall of the container above the lower end and below the life zone to prevent flooding of the life zone; and forming a plurality of snake support shelves within the communal chamber at a plurality of vertically-spaced locations between the lower end and an upper end of the container, including at least one snake support shelf in the life zone.

In some examples, installing the container at the hibernaculum site includes installing the container with an upper end of the container above the ground level, the method further comprising forming an overburden over the upper end of the container.

A level of groundwater outside the communal chamber may fluctuate between a seasonal high level during a first season and a seasonal low level during a second season, and the water outlet opens into the communal chamber at a position that is above the seasonal low level.

Forming the plurality of snake support shelves may include arranging cinder blocks within the communal chamber, each cinder block having at least one internal cell opening through the block.

BRIEF DESCRIPTION OF THE DRAWINGS

The drawings included herewith are for illustrating various examples of systems, methods, and apparatus of the present specification. In the drawings.

DETAILED DESCRIPTION

Various apparatus or processes will be described below to provide an example of each claimed embodiment. No example described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatus or processes described below.

Figure 1:
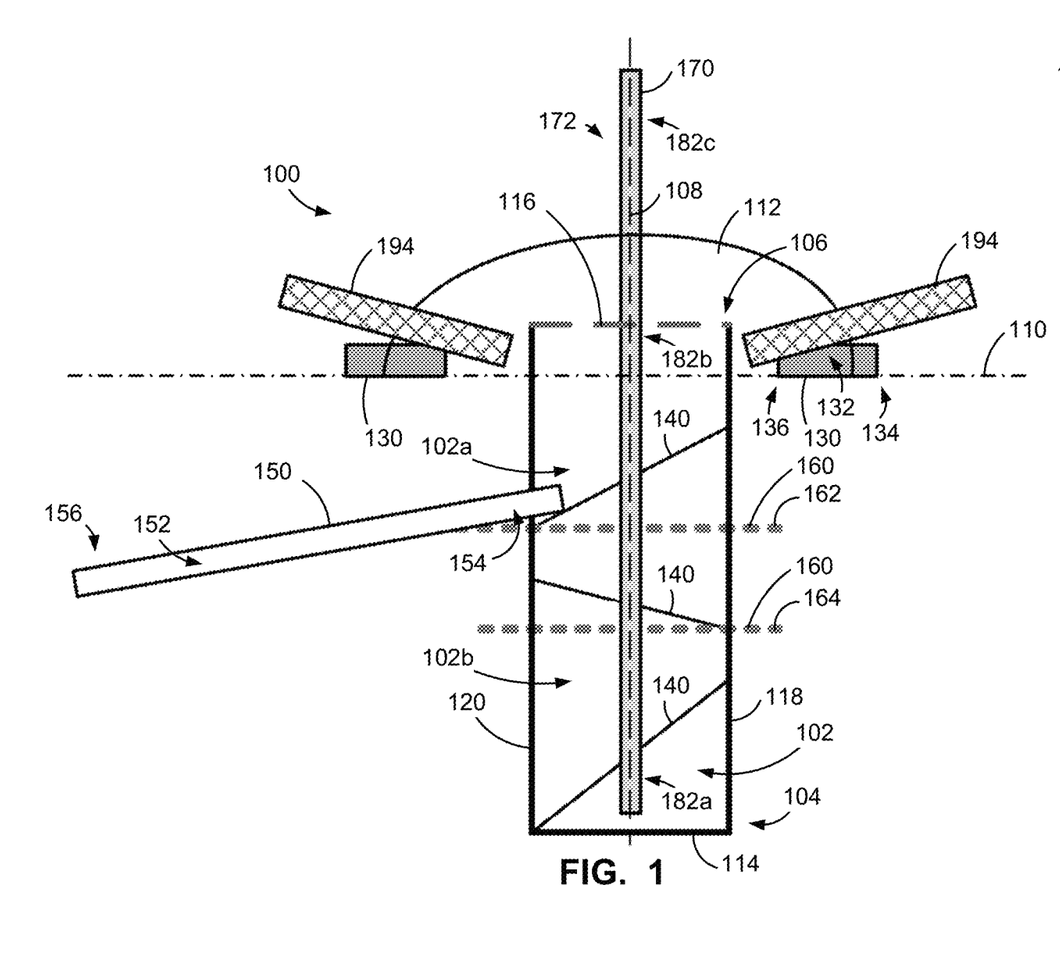
FIG. 1 is a side cross sectional view of a first communal snake hibernaculum, in accordance with an embodiment.

Referring now to FIG. 1, illustrated therein is an example of a communal snake hibernaculum 100. The communal snake hibernaculum 100 includes a communal chamber 102. The communal chamber 102 provides a subterranean space for a plurality of snakes to overwinter together. The hibernaculum 100 provides a life zone 102a within the communal chamber 102. The life zone 102a is configured to allow snakes to survive winter in a subterranean space that remain aerobic and does not freeze or flood completely. It will be appreciated that snakes can dive short lengths of time (e.g., a few hours) underwater, depending on temperature, by holding their breath, the length of time depending on the species and/or size of the snake. Therefore, a life zone can briefly flood for a short period of time (e.g., due to flash flooding caused by heavy rain). However, a life zone must not freeze because snakes cannot survive winter in a frozen state. Survival following brief exposures to freezing air temperatures outside a hibernacula has been documented for the red-sided garter snake, however this is not a continuous overwinter strategy. Mass die offs of Red-sided garter snakes have been documented from flooding and freezing of their hibernacula. In some examples, the life zone is above a groundwater level at the hibernaculum site. In some examples, the life zone is a zone between a frost line and a groundwater level at the hibernaculum site.

The chamber 102 also includes a water zone 102b configured to hold water through the winter to allow snakes to rehydrate. Snakes that choose a hibernaculum that is too dry are at risk of dehydration, and prolonged exposure to dry conditions can cause death. Some snakes can maintain water balance and avoid water loss due to thick skin and remaining in a coiled and still position to reduce water loss through evaporation. However, the presence of water within a hibernaculum provides an opportunity for the snake to re-hydrate periodically and maintain water balance.

A water outlet in a sidewall of the chamber 102 helps to control water levels within the chamber 102. When water rises in their hibernacula, e.g., from storm events, snakes may choose to dive and hold their breath for extended periods or climb higher up in the hibernacula towards the ground surface thus risking exposure to freezing temperatures to avoid submersion or contact with the water. Snakes that remain within the frost layer will die from freezing and snakes that remain underwater too long will drown. The water outlet allows water entering the chamber from above-ground water sources (e.g., storm events or melting) to freely pass through the sidewall to exit the chamber. In some examples, the water outlet is a port through the sidewall. In some examples, the water outlet includes a passage to carry water away from the hibernaculum. In some examples, the water outlet is above a groundwater level at the hibernaculum site.

In some examples, the communal chamber 102 is an open system in that the water therein is in direct contact with the groundwater (e.g., through water permeable walls) to provide thermal stability within the chamber 102. In some examples, the communal chamber 102 is a closed system in that the water contained therein is isolated from direct contact with groundwater (e.g., through water tight walls) and thermal stability is maintained using, e.g., insulation and air-movement limitation.

The communal chamber 102 has a lower end 104 and an upper end 106. Referring to FIG. 1, in the exemplary chamber 102 a vertical axis 108 extends between the lower end 104 and the upper end 106. The lower end 104 is below a ground level 110 (e.g., an average ground level around the hibernaculum apart from any overburden built over the hibernaculum). A lower end below a ground level provides a subterranean space. In some examples, the lower end 104 is below a frost level at the hibernaculum site, although in some examples temperature is maintained above freezing in other ways. While the entire chamber 102 may be below the ground level, in some examples the upper end is above the ground level. An upper end above the ground level provides easier access to the chamber (e.g., for snakes or for researchers interacting with the hibernaculum), reduces the chances of flooding, allows for easier air movement and ventilation, and/or allows for easier installation of the hibernaculum. Referring to FIG. 1, the exemplary upper end 106 is above the ground level 110. The upper end 106, when above the ground level 110, is insulated. Insulating the upper end 106 reduces heat transfer between the communal chamber and the ambient environment. Any suitable insulation may be used. Referring to FIG. 1, the exemplary upper end 106 is insulated by an overburden 112. The overburden 112 may include soil and/or rocks, such as rock ledges 194.

The chamber 102 may be any suitable shape, such as generally cylindrical, generally cuboid, or irregular in shape. Referring to FIG. 1, the exemplary chamber 102 is generally cylindrical. Referring to FIG. 1, the exemplary chamber 102 has a lower wall 114 at the bottom end and an upper wall 116 at the upper end with a sidewall 118 extending between the lower wall 114 and the upper wall 116. The sidewall 118 may be any suitable shape, such as generally circular in cross section for a generally cylindrical chamber or generally rectangular in cross section for a generally cuboid chamber. It will be appreciated that the lower wall 114 and/or upper wall 116 may be, e.g., generally planar, concave, or irregular in shape.

The exemplary sidewall 118 is a wall of a container 120 that is installed in the ground at the hibernaculum site 122. The container 120 provides stability to the shape of the chamber 102 to prevent chamber collapse or erosion. In some examples, the container 120 is pre-formed before installation in the ground (e.g., a plastic drum transported to the site and installed), though in some examples the container may be formed at the hibernaculum site 122 (e.g., concrete pored at the site). In some examples, one or both of the upper wall 116 and the lower wall 114 are also part of the container 120.

The walls forming the lower end 104 of the chamber are resistant to the passage of water. In use, the walls forming the lower end 104 of the chamber 102 form a barrier between water within the chamber 102 and groundwater around the chamber 102. The walls forming the lower end 104 may be formed of any suitable material, such as concrete, cement, or plastic. In some examples, the walls forming the lower end 104 prevent the free movement of water but are not water-tight (e.g., walls formed of a material that is not water-proof and/or a sidewall 116 that is not sealed to a lower wall 114). However, in some examples, the walls forming the lower end 104 are water-tight. Referring to FIG. 1, the walls forming the lower end 104 are walls of a cement tank with a flat bottom wall and cylindrical sidewall cast together as a unitary body.

The communal chamber 102 includes a snake entrance 130. The snake entrance 130 opens from an exterior of the hibernaculum 100 into the chamber 102. Referring to FIG. 1, the exemplary snake entrance 130 includes a passage 132 extending between an intake end 134 opening to an exterior of the hibernaculum 100 and an outlet end 136 opening to an interior of the communal chamber 102. It will be understood that, in some examples, a snake entrance 130 can also be used as a snake exit. In some examples, more than one snake entrance 130 is included. In some examples, at least three snake entrances 130 are included. Where a plurality of snake entrances are included, the snake entrances 130 may all be generally the same or a hibernaculum 100 may include two or more different types of entrances. Different types of snake entrances 130 may differ based on entry method (e.g., passive vs. manual) and/or differ in the snake type that they are configured to be used by (e.g., passage transverse size, passage length, passage entrance shape, passage entrance location, and/or passage wall material).

The communal chamber 102 also includes a plurality of snake support shelves 140 within the chamber 102. The snake support shelves 140 are arranged within the chamber 102 at a plurality of vertically-spaced locations between the upper end 106 and the lower end 104. A plurality of vertically-spaced support shelves allows a snake to move up and down within the chamber 102 as desired to find a location suitable for the snake. A snake may move down within the chamber 102 to find a warmer location within the chamber 102, e.g., during a cold mid-winter period. A snake may move down within the chamber 102 to access the water within the chamber 102 to rehydrate. A snake may move up within the chamber 102 to avoid drowning when the water level within the chamber rises. The snake shelves 140 form resting surfaces on which the snakes may rest, and the resting surface may be horizontal and/or angled. Referring to FIG. 1, the exemplary snake support shelves 140 form resting surfaces which are angled relative to the vertical axis to facilitate snake movement from one resting surface to another. The snake support shelves 140 may be formed from any suitable material arranged in the chamber 102 (e.g., dropped into the container 120), such as large rocks, pieces of wood, concrete blocks, and/or cinder blocks.

The communal snake hibernaculum 102 includes a water outlet 150. The water outlet 150 is provided to prevent the communal chamber 102 from flooding. Water may enter the hibernaculum 100 through, e.g., a water inlet (e.g., an inlet passage for seasonally freshening the water, as described elsewhere herein), filtering through the overburden and into the chamber at the upper end 106 if the upper end 106 is not water-tight, and/or seeping through the walls of the lower end 104 if the walls are not water-tight. According, an increase in water level within the chamber 102 may be driven by increases in the level of groundwater and/or by above-ground water sources (e.g., rain or melting snow). In some examples, the water outlet 150 is provided to provide drainage when water-level increases are driven by above-ground water sources.

In some examples, the water outlet 150 may be a simple port in a wall of the chamber 102, however in some examples the water outlet 150 includes a passage to carry water away from the chamber 102. Referring to FIG. 1, the exemplary water outlet 150 includes a passage 152 extending between an intake end 154 and a discharge end 156. The intake end 154 is in the sidewall 118 of the communal chamber 102. The intake end 154 opens into the chamber 102 at a location that is above the lower end 104 and below at least one of the snake support shelves 140 to prevent flooding of the communal chamber 102. In use, water is held in the lower end of the communal chamber 102 for snake rehydration, but the water level is prevented from rising over all of the support shelves 140 by the water outlet 150. In some examples, the intake and/or discharge ends of the passage 152 are screened to prevent snakes from entering the passage 152.

Any suitable water outlet 150 may be used. In some examples, the water outlet may be an active (e.g., powered) water outlet, such as a water outlet that includes a pump to remove water as needed to maintain a water level below at least one of the snake support shelves. However, in some examples, the water outlet 150 is a passive water outlet. A passive water outlet 150 uses gravitational force to drain water from the chamber 102. In some examples, the discharge end 156 is below the intake end 154. A passive water outlet 150 with a passage 152 has a discharge end 156 shaped and/or positioned to discharge water from the water outlet 150. In some examples, the discharge end 156 is above ground (e.g., into an adjacent depression in the ground, as described further below). In some examples, the discharge end 156 is underground (e.g., into a drainage bed, such as a bed of gravel). A water outlet 150 with an underground discharge end 156 has an intake end 154 above a groundwater level 160, and optionally the discharge end 156 is also above the groundwater level 160.

Referring to FIG. 1, a groundwater level 160 at the exemplary hibernaculum site 122 fluctuates between a seasonal high level 162 and a seasonal low level 164. The intake end 154 of the exemplary water outlet 150 of FIG. 1 is above the seasonal low level 164. In some examples, the intake end 154 is also above the seasonal high level 162. The exemplary discharge end 156 of FIG. 1 is also above the seasonal low level 164. In some examples, the discharge end 156 is also above the seasonal high level 162. In some examples, the intake end 154 is between 30 cm and 70 cm below the ground level 110, between 40 cm and 60 cm below the ground level 110, or about 50 cm below the ground level 110. In some examples, the discharge end 156 is between 30 cm and 70 cm below the ground level 110, between 40 cm and 60 cm below the ground level 110, or about 50 cm below the ground level 110. The discharge end 156 of the exemplary water outlet 150 of FIG. 1 is at a depth 166 of about 50 cm below the ground level 110. The discharge end 156 of the water outlet 150 is below the intake end 154 to encourage water flow through the outlet 150.

In some examples, the hibernaculum includes a monitoring well 170. The monitoring well 170 extends into the chamber 102 from an exterior of the hibernaculum 100 to permit users (e.g., researchers) to access the interior of the chamber 102 to, e.g., insert or access sensors. Referring to FIG. 1, the exemplary hibernaculum 100 includes a monitoring well 170 extending into the chamber 102 through the upper end 106. In some examples, the well 170 includes a generally vertically extending casing 171 with apertures 176 spaced along its length. In some examples, the casing is generally linear. A linear casing allows a floating water level sensor to move freely along the length of the well. In some examples, a well 170 is supported by a rebar support 173, which may extend along the length of the well 170 and be anchored at the top and bottom ends. Referring to FIG. 1, the exemplary well 170 is a linear, vertical pipe containing a floating sensor.

Figure 1A:
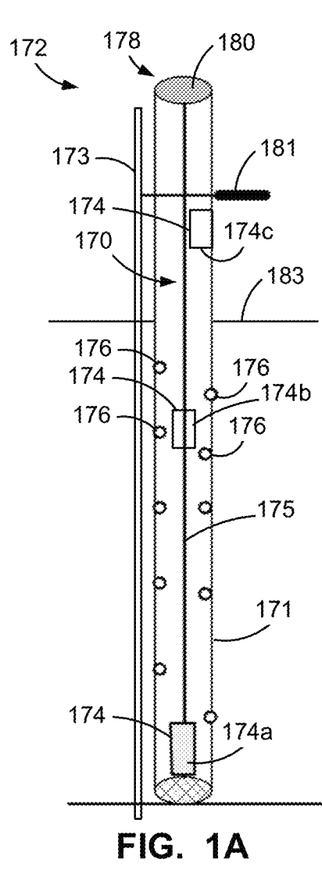
FIG. 1A is a top perspective view of a monitoring system of the hibernaculum of FIG. 1.

In some examples, the hibernaculum 100 includes a monitoring system 172. The monitoring system 172 includes a sensor 174 operable to sense a water level, temperature, and/or water quality. In some examples, the sensor 174 is attached to a cable 175 located within the monitoring well 170. The cable 175 may be used to lower and raise the sensor 174, e.g., for user access. In some examples, the sensor 174 is suspended within the well by the cable 175. In some examples, the sensor 174 is a logger that stores detected data locally to be accessed by a user at the hibernaculum site 122 (e.g., by plugging into the logger). In some examples, the sensor 174 includes a transmitter to transfer data to a remote location (e.g., includes an antenna). Referring to FIG. 1A, the exemplary monitoring system 172 includes a water level logger sensor 174a in the well 170, a temperature logger 174b, and an air barometer 174c. The exemplary water level logger sensor 174 of FIG. 1A also logs temperature data. In some examples, the sensor 174 is contained in the well 170. The exemplary sensor 174 is contained in the well 170, and the exemplary well 170 extends down into the chamber 102 and is in thermal and fluid communication with the interior of the chamber 102 via a plurality of inlets 176 along the length thereof. The inlets 176 are small inlets to prevent snake access, such as less than 10 mm in diameter, less than 6 mm in diameter, or less than 5 mm in diameter. The well 170 is installed with at least some inlets 176 below a frost line 183. Referring to FIGS. 1A, the exemplary well 170 has an openable access end 178 selectively closed by a cap 180. The cap 180 closes off the openable access end 178 to prevent animals from entering the casing 171, while at the same time leaving the well 170 selectively openable for access by users (e.g., researchers). In some examples, the bottom end of the casing 171 opposite the access end 178 is also closed and/or screened to prevent animal access. The exemplary monitoring system 172 of FIG. 1A also includes a lock 181 to prevent unauthorized access to the sensors 174.

In some examples, the monitoring system 172 includes a plurality of sensors 174, such as a floating sensor to provide water level data (and optionally temperature data at the water surface) and one or more fixed position sensors to provide temperature data for a fixed location within the chamber 102. In some examples, the floating sensor and the one or more fixed sensors are all contained in the well 170 for ready access. Referring to FIG. 1, in some examples a monitoring system 172 includes a floating sensor in the well 170, and one or more of a fixed sensor in a first location 182a at a bottom end of the well 170 to provide temperature data for the bottom end of the chamber 102, a fixed sensor in the well 170 in a second location 182b at the upper end of the chamber 102 to provide temperature data for the top end of the chamber 102, and a fixed sensor in a third location 182c at a top end of the well 170 to provide temperature data for the ambient environment outside the hibernaculum.

Figures 2A, 2B:
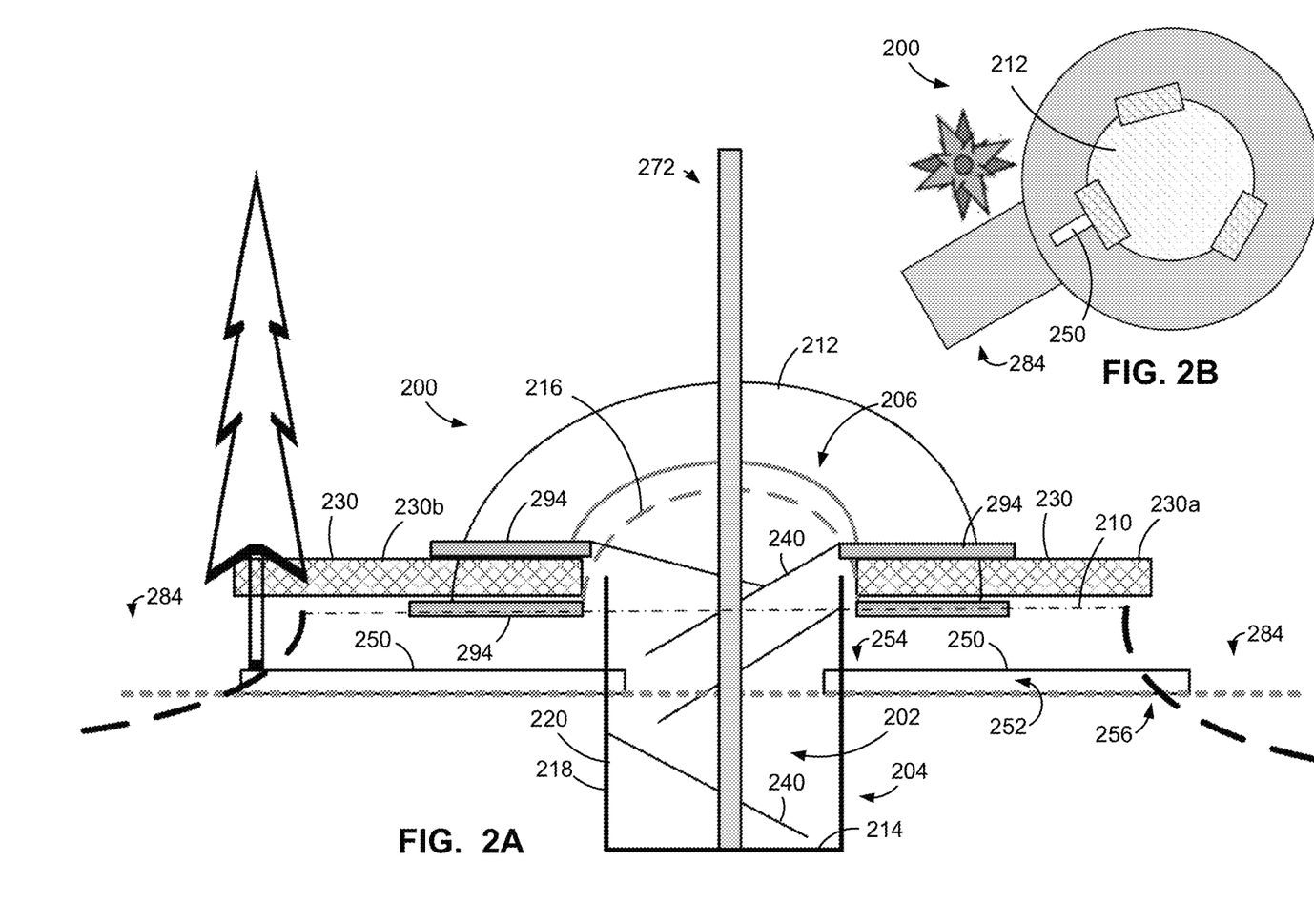
FIG. 2A is side cross sectional view of a second communal snake hibernaculum, in accordance with an embodiment.
FIG. 2B is a top view of the hibernaculum of FIG. 2A.

Referring now to FIGS. 2A and 2B, the exemplary communal snake hibernaculum 200 is similar in many respects to communal snake hibernaculum 100, and like components are indicated by like reference numbers incremented by 100.

The exemplary communal snake hibernaculum 200 of FIGS. 2A and 2B includes a communal chamber 202 with a lower end 204 below a ground level 210 and an upper end 206 above the ground level 210 and insulated by an overburden 212. The chamber 202 includes a sidewall 218, an upper wall 216, and a lower wall 214. The exemplary communal chamber 202 of FIGS. 2A and 2B includes a plurality of snake entrances 230, a plurality of snake support shelves 240, a monitoring system 272, and a water outlet 250.

As noted above, in some examples, a water outlet has an above-ground discharge end. Referring to FIGS. 2A and 2B, the exemplary water outlet 250 has an above-ground discharge end 256. The exemplary discharge end 256 of FIGS. 2A and 2B opens into a swale 284. The exemplary swale 284 of FIGS. 2A and 2B is adjacent the hibernaculum 200 to reduce the necessary length of the passage 282, although in some examples the passage 282 may be a long passage to, e.g., carry water to a distant depression in the ground. In some examples, the dirt removed to create the swale is used to form the overburden over the upper end of the chamber 202.

In some examples, a snake hibernaculum 200 includes different classes of snake entrances. Different classes of snake entrances may be configured for different types of snakes (e.g., different species and/or different sizes) and/or different entry methods (e.g., of the snake's own volition or manually introduced by a user).

Referring to FIGS. 2A and 2B, the exemplary hibernaculum 200 includes a first snake entrance 230a for a first type of snake and a second snake entrance 230b for a second type of snake, the second type of snake being different from the first type of snake. In some examples, the second type of snake is a different species than the first type of snake (e.g., massasauga rattlesnake vs. fox snake). In some examples, the second type of snake is a different diameter than the first type of snake. In some examples, entrances for different types of snake differ from one another by minimum transverse passage area (e.g., different minimum diameters for cylindrical passages), wall construction (e.g., amount of traction), and/or location (e.g., intake end height above ground level or intake end size and shape). Referring to FIGS. 2A and 2B, the exemplary first snake entrance 230a has a larger diameter than the exemplary second snake entrance 230b. Different classes of entrance may also or alternatively differ based on intake end characteristics, such as whether the intake end opening to the outside of the hibernaculum is overhung by rock ledges 294 or other overburden material. Referring to FIGS. 2A and 2B, the exemplary snake entrances 230 extend beyond the overburden material.

Figures 3A, 3B:
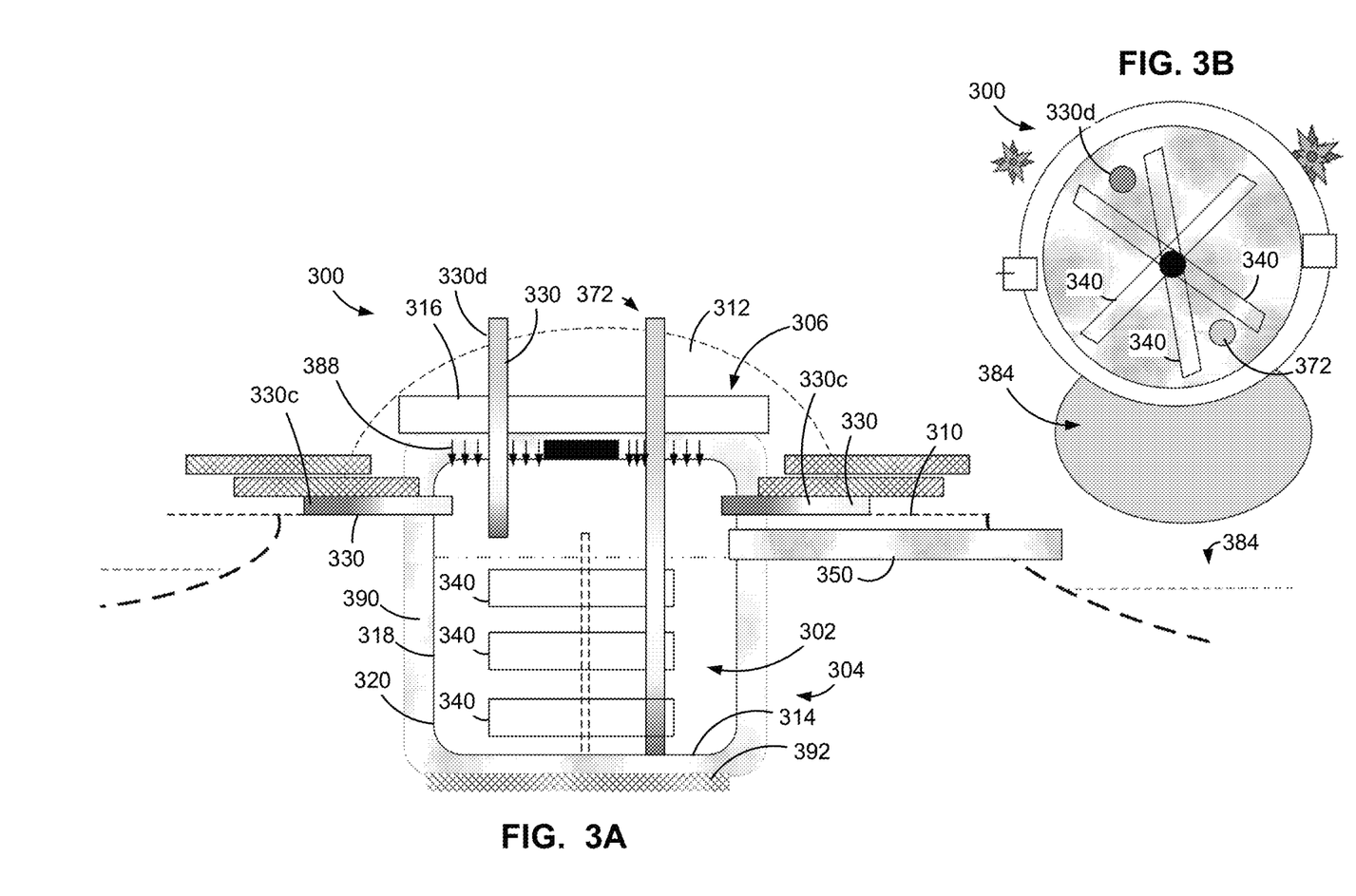
FIG. 3A is side cross sectional view of a third communal snake hibernaculum, in accordance with an embodiment.
FIG. 3B is a first top cross sectional view of the hibernaculum of FIG. 3A.
Figure 3C:
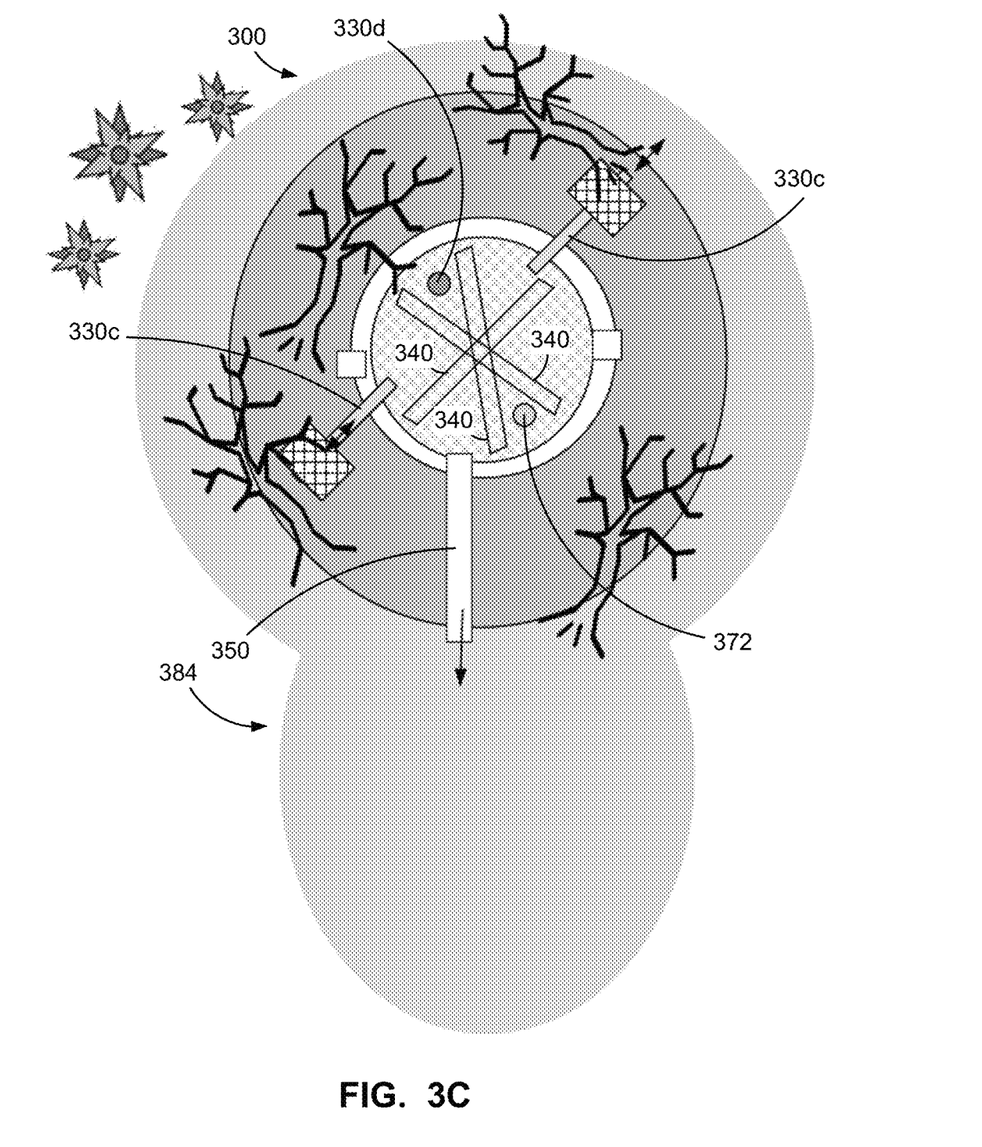
FIG. 3C is a second top cross sectional view of the hibernaculum of FIG. 3A.

Referring to FIGS. 3A to 3C, the exemplary communal snake hibernaculum 300 is similar in many respects to communal snake hibernaculum 100, and like components are indicated by like reference numbers incremented by 200.

The exemplary communal snake hibernaculum 300 of FIGS. 3A to 3C includes a communal chamber 302 with a lower end 304 below a ground level 310 and an upper end 306 above the ground level 310 and insulated by an overburden 312. The chamber 302 includes a sidewall 318, an upper wall 316, and a lower wall 314. The exemplary communal chamber 302 of FIGS. 3A to 3C includes a plurality of snake entrances 330, a plurality of snake support shelves 340, a monitoring system 372, and a water outlet 350 to a swale 384.

Referring to FIGS. 3A to 3C, the exemplary snake support shelves 340 are formed by pipe angular portions, such as half-pipes. The exemplary angular positions of FIGS. 3A to 3C are portions of plastic pipes, such as polyvinyl chloride (PVC) pipes.

As mentioned elsewhere herein, in some examples the sidewall 318 and the one or both of the upper wall 316 and the lower wall 314 that are also part of the container 320 are secured to one another in a water-tight connection (e.g., the container 320 may be formed of a unitary body comprising the sidewall 318 and one or both of the upper wall 316 and the lower wall 314). For example, the container 320 may include a plastic (e.g., polyethylene) cylindrical sidewall from a water storage tank (e.g., from a Bushman™ water storage tank). Referring to FIGS. 3A to 3C, the exemplary hibernaculum 300 includes a unitary container 320 forming the lower wall 314 and the sidewall 318. In the exemplary hibernaculum 300 of FIGS. 3A to 3C, the container 320 is a cylindrical plastic tank, and the upper wall 316 is formed by a removable lid over an open end of the plastic tank. The exemplary plastic drum of FIGS. 3A to 3C is a molded polyethylene tank.

In some examples in which the container 320 is formed of a material that is lighter than concrete or cement, such as plastic, the hibernaculum further includes additional insulation and/or stability support.

In some examples, the sidewall 318 is insulated. Referring to FIGS. 3A to 3C, the exemplary sidewall 318 is insulated by a layer of insulation 390. The insulation 390 may be interior or exterior to the container sidewall. The exemplary insulation 390 of FIGS. 3A to 3C is exterior insulation against the sidewall 318. The insulation can be any suitable material. In some examples, the insulation is formed of a natural fiber. In some examples, the insulation 390 is formed of hemp. While the insulation 390 extends over the bottom wall 314 and/or top wall 316 in some examples, in some examples the top wall 316 is only insulated by the overburden and the bottom wall 314 is uninsulated.

In some examples, the hibernaculum 300 includes a support layer under the container 320. Referring to FIGS. 3A to 3C, the exemplary container 320 is supported on a support layer 392. The support layer 392 forms a hard surface to support the container 320, e.g., against rocking and/or settling. The exemplary support layer 392 of FIGS. 3A to 3C is a masonry support layer. In some examples, a masonry support layer is formed of rocks, bricks, and/or tiles. The exemplary support layer 392 of FIGS. 3A to 3C is formed of a layer of laterally-abutting patio stones.

In some examples in which the chamber 304 is a closed system relative to groundwater (e.g., the bottom end 304 is water-tight) the water contained in the chamber 302 is freshened by water coming in through an upper end of the chamber 304 and/or through a water inlet passage opening into the chamber. In some examples, water filters into the upper end of the chamber through a porous upper end, such as by filtering through the overburden and through a water-permeable cover on which the overburden rest. Referring to FIGS. 3A to 3C, the exemplary hibernaculum 300 includes a water-permeable upper wall 316 to close the open upper end of the plastic drum that forms the sidewall 318 and bottom wall 314 of the chamber 302. The water-permeable upper wall 316 allows a water flow 388 to filter through the overburden and into the upper end 306 of the chamber 302. In some examples, the water-permeable upper wall 316 is a removeable cover.

In some examples, a communal snake hibernaculum 300 includes different types of entrances for different entry methods. Referring to FIGS. 3A to 3C, the exemplary hibernaculum 300 includes a third snake entrance 330c which is a passive snake entrance and a fourth snake entrance 330d which is a manual snake entrance. A passive snake entrance is provided to allow a snake to enter the hibernaculum of its own volition. A manual entrance is provided to allow a user (e.g., a researcher) to insert a snake into the hibernaculum. In use, users may introduce snakes into the hibernaculum to familiarize the snakes with the hibernaculum and promote use of the hibernaculum. As snakes become familiar with the hibernaculum, they may be more likely to use the hibernaculum of their own volition.

In some examples, a passive entrance is always open while a manual entrance is selectively closed by a door (e.g., a lid covering the intake end). In some examples, a passive entrance is shaped to inhibit rain entry (e.g., intake port directed laterally or downward, intake end and outlet end at generally equal elevations, and/or intake end raised above the ground level 310 to inhibit over-land water entrance). In some examples, a manual entrance is shaped to cause a snake introduced into the intake end to exit into the chamber (e.g., low-traction walls, intake end at an elevation that is above the outlet end, and/or walls forming a generally continuous ramp). In some examples, the manual entrance 330d has an intake end outside the chamber at an elevation above the discharge end inside the chamber. In some examples, the manual entrance 330d includes a passage that is extends downward continuously along the entire length of the passage to encourage snakes introduced into the passage to continue down the passage to the end. In some examples, the intake end of the manual passage 330d is generally vertical and/or smooth sided to prevent snakes that have been introduced into the manual entrance 330d from exiting through the manual entrance 330d. The exemplary manual entrance 330d of FIGS. 3A to 3C includes a vertically-extending linear passage 332, e.g., to drop a snake into the communal chamber 302. In some cases, a manual snake entrance may be sealed up or converted to a passive snake entrance after a period of time (e.g., a year or a few years), e.g., after snakes have become used to using the hibernaculum. The manual entrance may be converted by, e.g., removing a vertical and/or smooth-sided portion of a passage.

Figures 4A, 4B:
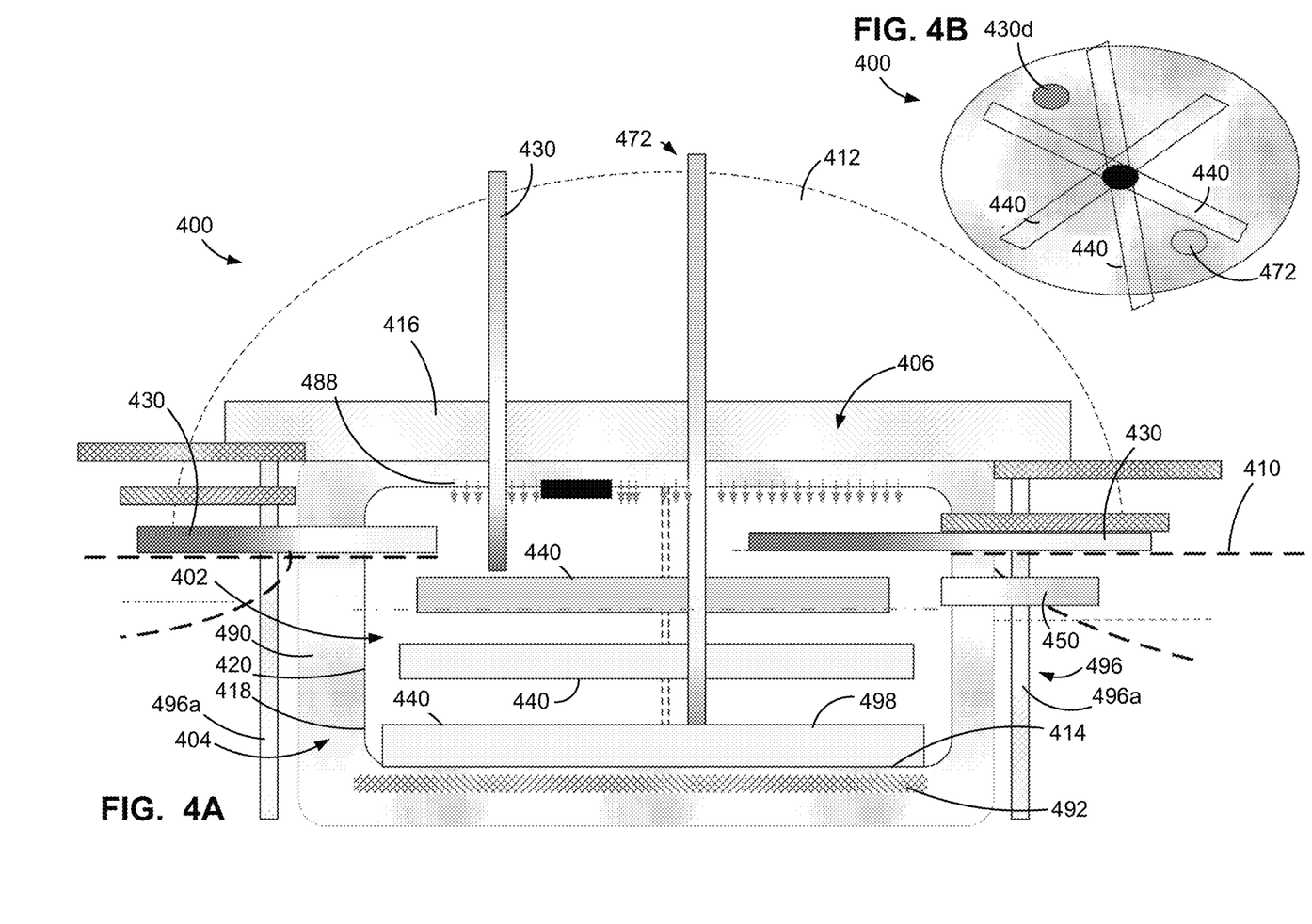
FIG. 4A is side cross sectional view of a fourth communal snake hibernaculum, in accordance with an embodiment.
FIG. 4B is a top cross sectional view of the hibernaculum of FIG. 4A.

Referring to FIGS. 4A and 4B, the exemplary communal snake hibernaculum 400 is similar in many respects to communal snake hibernaculum 100, and like components are indicated by like reference numbers incremented by 300.

The exemplary communal snake hibernaculum 400 of FIGS. 4A and 4B includes a communal chamber 402 with a lower end 404 below a ground level 410 and an upper end 406 above the ground level 410 and insulated by an overburden 412. The chamber 402 includes a sidewall 418, an upper wall 416, and a lower wall 414. The exemplary communal chamber 402 of FIGS. 4A and 4B includes a plurality of snake entrances 430, a plurality of snake support shelves 440, a monitoring system 472, and a water outlet 450.

The exemplary hibernaculum 400 of FIGS. 4A and 4B includes a framework 496 to support the upper wall 416. The hibernaculum 400 maintains a chamber 402 against collapse. The framework 496 is provided to hold up the upper wall 416 and the weight of the insulating overburden, e.g., where the container is formed of a material (e.g., plastic) that is not strong enough to support the weight of the overburden 412. Any suitable framework may be used, and the framework may be anchored in or against any suitable support layer. Referring to FIGS. 4A and 4B, the exemplary framework 496 includes generally vertical support beams 496a extending generally parallel to the sidewall 418 and anchored in the earth below the support layer 492 (e.g., a layer of patio stones in an insulation layer 490). In some examples, support beams are braced against and/or anchored in the support layer 492. In some examples, the support beams are wooden beams.

In some examples, the lowest shelf 440 is arranged against the bottom wall 414 to prevent snakes from moving between the lowest shelf and the bottom wall and becoming trapped. In some examples, the lowest shelf 440 is anchored to the bottom wall 414. Referring to FIGS. 4A and 4B, the exemplary chamber 402 includes a cedar wood insert 498 within the bottom end 404. The cedar wood insert 498 is arranged to be in contact with water that is within the chamber 402. In use, the cedar wood lowers the pH of the water in the chamber. Referring to FIGS. 4A and 4B, the exemplary cedar wood insert 498 forms the lowest shelf 440 within the chamber 402.

Figures 5A, 5B:
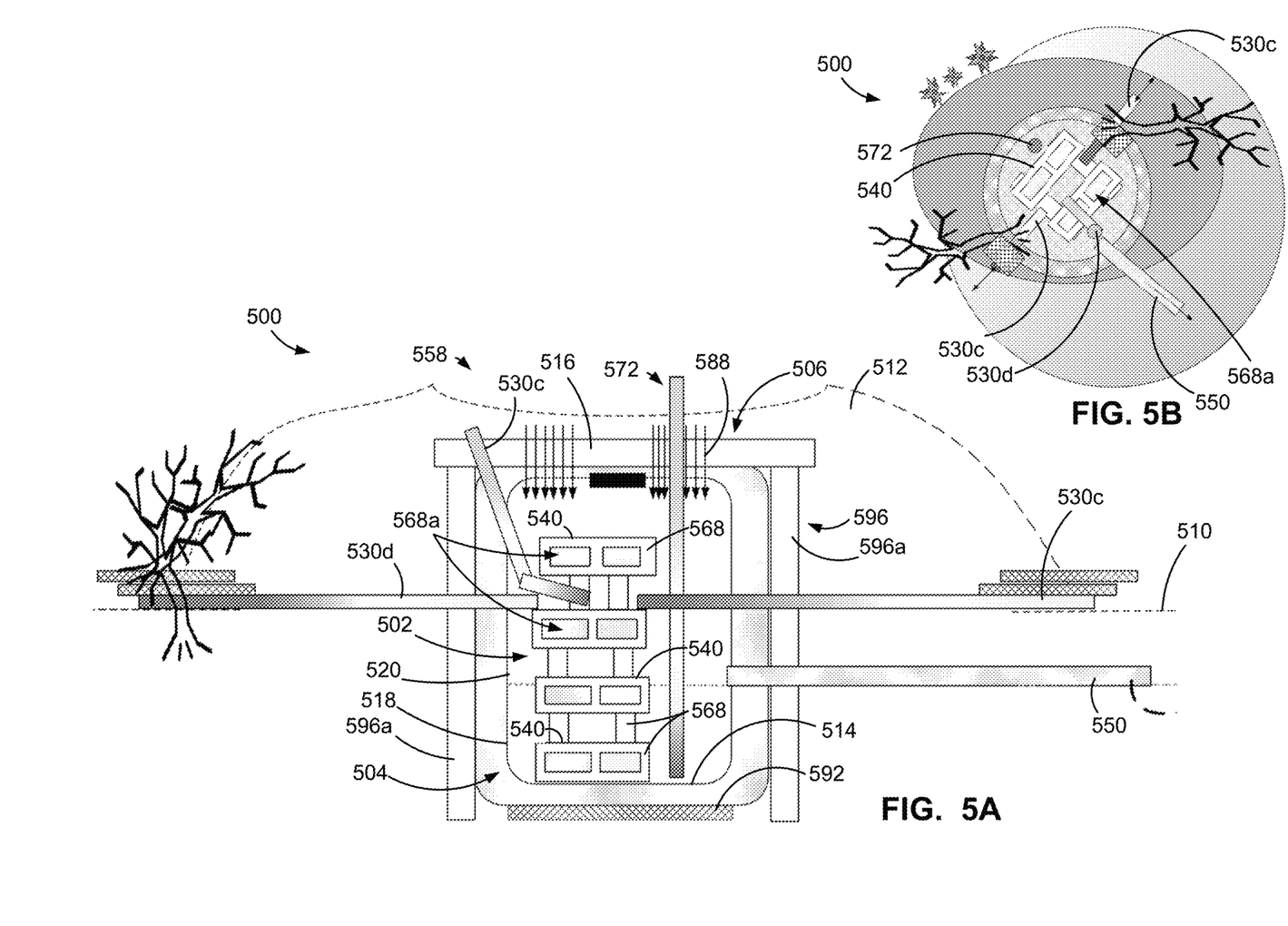
FIG. 5A is side cross sectional view of a fifth communal snake hibernaculum, in accordance with an embodiment.
FIG. 5B is a top cross sectional view of the hibernaculum of FIG. 5A.

Referring to FIGS. 5A and 5B, the exemplary communal snake hibernaculum 500 is similar in many respects to communal snake hibernaculum 100, and like components are indicated by like reference numbers incremented by 400.

The exemplary communal snake hibernaculum 500 of FIGS. 5A and 5B includes a communal chamber 502 with a lower end 504 below a ground level 510 and an upper end 506 above the ground level 510 and insulated by an overburden 512. The communal chamber 502 includes a sidewall 518, an upper wall 516, and a lower wall 514. The exemplary communal chamber 502 of FIGS. 5A and 5B includes a plurality of snake entrances (including a manual entrance 530d and a passive entrance 530c), a plurality of snake support shelves 540, a monitoring system 572, and a water outlet 550. The exemplary hibernaculum also includes a support framework 596 with support beams 596a.

The exemplary overburden 512 of FIGS. 5A and 5B includes a water collection feature 558. The exemplary water collection feature 558 is a depression in the overburden 512 to collect water, e.g., melt water or rain water. The exemplary collection feature 558 of FIGS. 5A and 5B overlies the upper end 506 of the communal chamber 502 to encourage water to flow 588 through the overburden and into the chamber 502 to freshen the water within the chamber 502.

The exemplary snake support shelves 540 of FIGS. 5A and 5B are formed of masonry blocks 568. Masonry blocks 568 may be, e.g., cinder blocks, concrete blocks, bricks, or blocks of natural stone. In some examples, a masonry blocks 568 has a cell 568a opening through the block. Cells opening through the blocks provide crannies for snake movement and occupation. The exemplary masonry blocks 568 of FIGS. 5A and 5B are cinder blocks, each with two open cells 568a. The exemplary snake shelves 540 of FIGS. 5A and 5B are formed by stacked cinder blocks.

Figure 6:
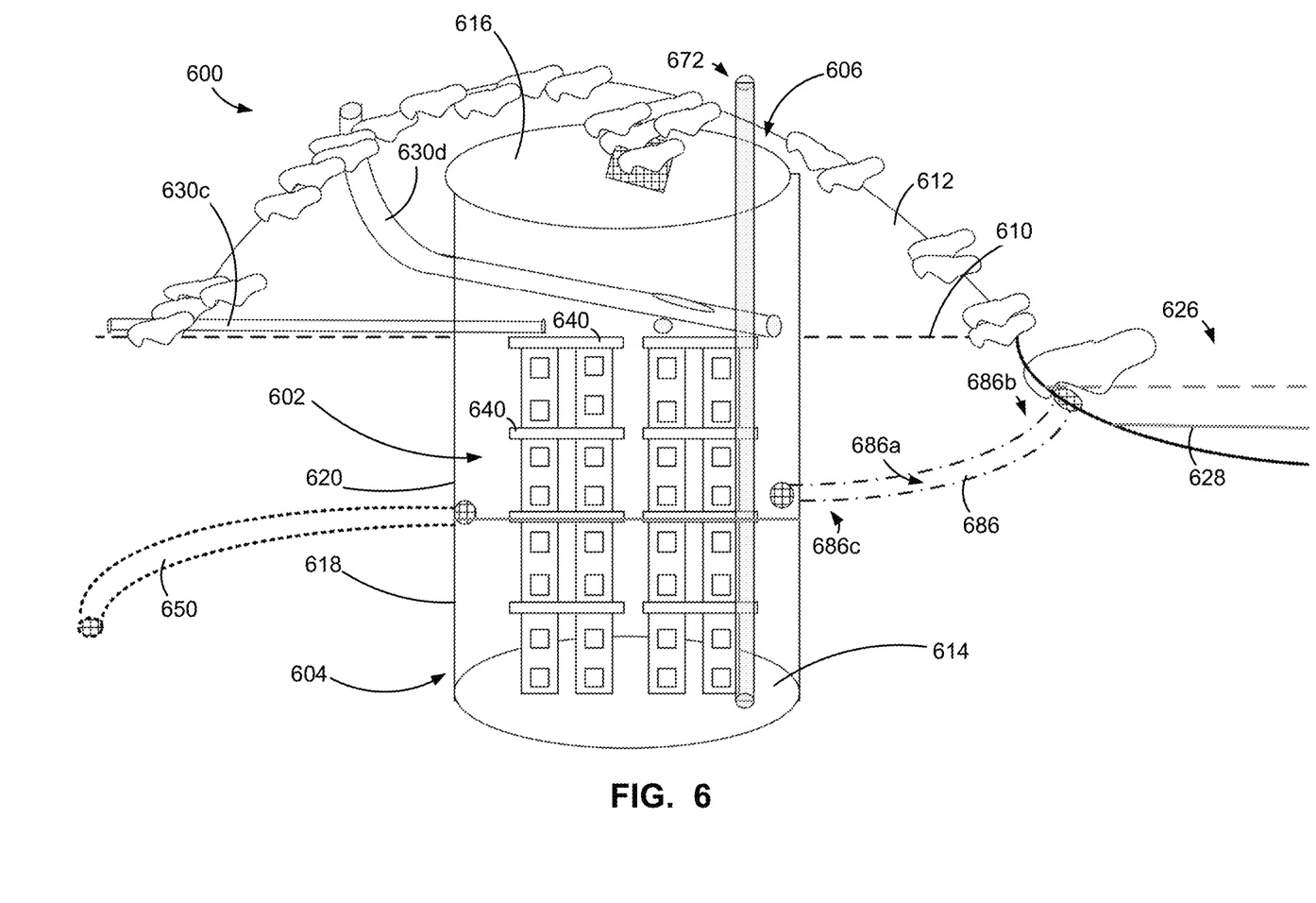
FIG. 6 is a top perspective cross sectional view of a sixth communal snake hibernaculum, in accordance with an embodiment.

Referring to FIG. 6, the exemplary communal snake hibernaculum 600 is similar in many respects to communal snake hibernaculum 100, and like components are indicated by like reference numbers incremented by 500.

The exemplary communal snake hibernaculum 600 of FIG. 6 includes a communal chamber 602 with a lower end 604 below a ground level 610 and an upper end 606 above the ground level 610 and insulated by an overburden 612. The exemplary chamber 602 includes a sidewall 618, an upper wall 616, and a lower wall 614. The exemplary communal chamber 602 of FIG. 6 includes a plurality of snake entrances (including a manual entrance 630d and a passive entrance 630c), a plurality of snake support shelves 640, a monitoring system 672, and a water outlet 650.

Referring to FIG. 6, the exemplary snake hibernaculum 600 includes a water inlet 686. The water inlet 686 is provided to allow water to enter the chamber 602 to freshen the water in the bottom end of the chamber. The water inlet 686 may be provided in addition to, or as an alternative, to other pathways of water entry such as seepage through the overburden and upper wall and/or seepage through the sidewall or between the sidewall and the bottom wall. The water inlet 686 may be provided to seasonally freshen the water in the chamber 602.

In some examples, the water inlet 686 may be a simple port in a wall of the chamber 102, however in some examples the water inlet 686 includes a passage to carry water into the chamber 602. Referring to FIG. 6, the exemplary water inlet 686 includes a passage 686a extending between an intake end 686b opening to an outside of the hibernaculum and a discharge end 686c opening into the communal chamber 602.

Any suitable water inlet 686 may be used. In some examples, the water inlet may be an active (e.g., powered) water outlet, such as a water inlet that includes a pump to add water as needed. However, in some examples, the water inlet 686 is a passive water inlet. A passive water inlet 686 uses gravitational force to drain water from a source into the chamber 602. In some examples, the discharge end 686c is below the intake end 686b.

The intake end 686b and the discharge end 686c may each be at any suitable location. The exemplary discharge end 686c of FIG. 6 opens through the sidewall 618 of the chamber 602. In some examples, the discharge end 686c opens through another wall of the chamber 602, such as the upper wall 616. The exemplary discharge end 686c of FIG. 6 opens above the intake end 654 of the water outlet 650. In some examples, the discharge end 686c of the water inlet is below the intake end 654 of the water outlet 650 (e.g., maintaining a water level in the chamber that is lower than the intake end of the water outlet or using hydrostatic pressure or pumping to raise the water level in the chamber 602 to the intake end 654 of the water outlet).

In some examples, the intake end 686b of the water inlet 686 includes an above-ground intake port. In some examples, the intake end 686b opens to a seasonally available water supply to seasonally introduce new water to the communal chamber. Referring to FIG. 6, the exemplary intake end 686b is above-ground and opens to an upper portion of a water-holding depression 626. The water level 628 in the depression 626 fluctuates seasonally, and is below the intake end 686b during a first season (e.g., winter) and above the intake end 686b during a second season (e.g., spring and/or fall).

Figure 7:
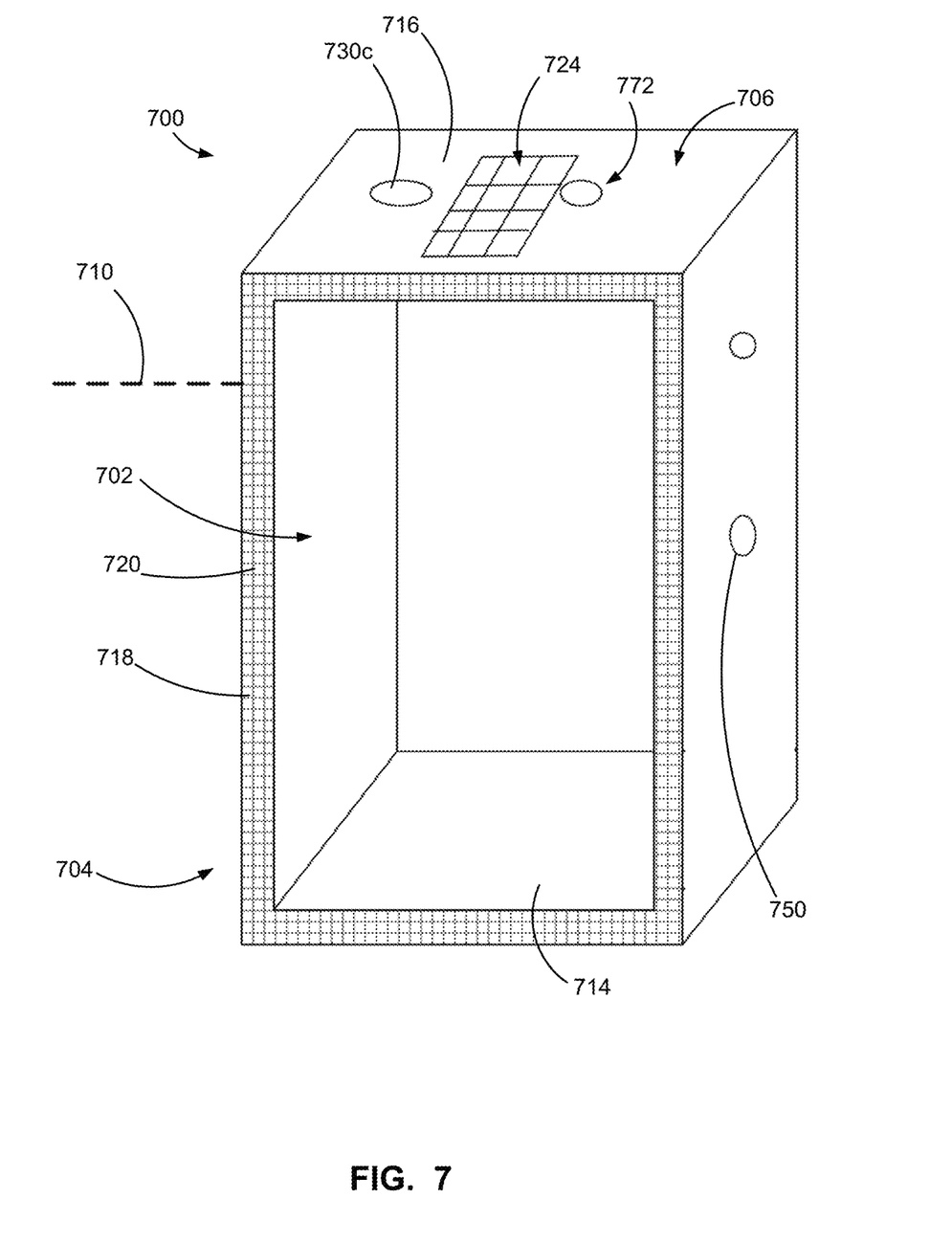
FIG. 7 is a top perspective cross sectional view of a seventh communal snake hibernaculum, in accordance with an embodiment.

Referring to FIG. 7, the exemplary communal snake hibernaculum 700 is similar in many respects to communal snake hibernaculum 100, and like components are indicated by like reference numbers incremented by 600.

The exemplary communal snake hibernaculum 700 of FIG. 7 includes a communal chamber 702 with a lower end 604 below a ground level 710 and an upper end 706 above the ground level 710. The exemplary chamber 702 includes a sidewall 718, an upper wall 716, and a lower wall 714. The exemplary communal chamber 702 of FIG. 7 includes a plurality of snake entrances 730 (including a manual entrance 730d and a passive entrance 730c) and a water outlet 750. The exemplary outlet 750 is a 4 inch diameter port opening through the sidewall 718.

Referring to FIG. 7, the exemplary chamber 702 is formed by a cuboid container 720. The exemplary container 720 is a cement box having a screened manhole opening 724 in the top wall 716. The screened manhole opening 724 allows water precipitation into the chamber 702. In some examples, a cement container is sealed to be water-tight, e.g., by the application of a sealant layer or film.

Figure 8:
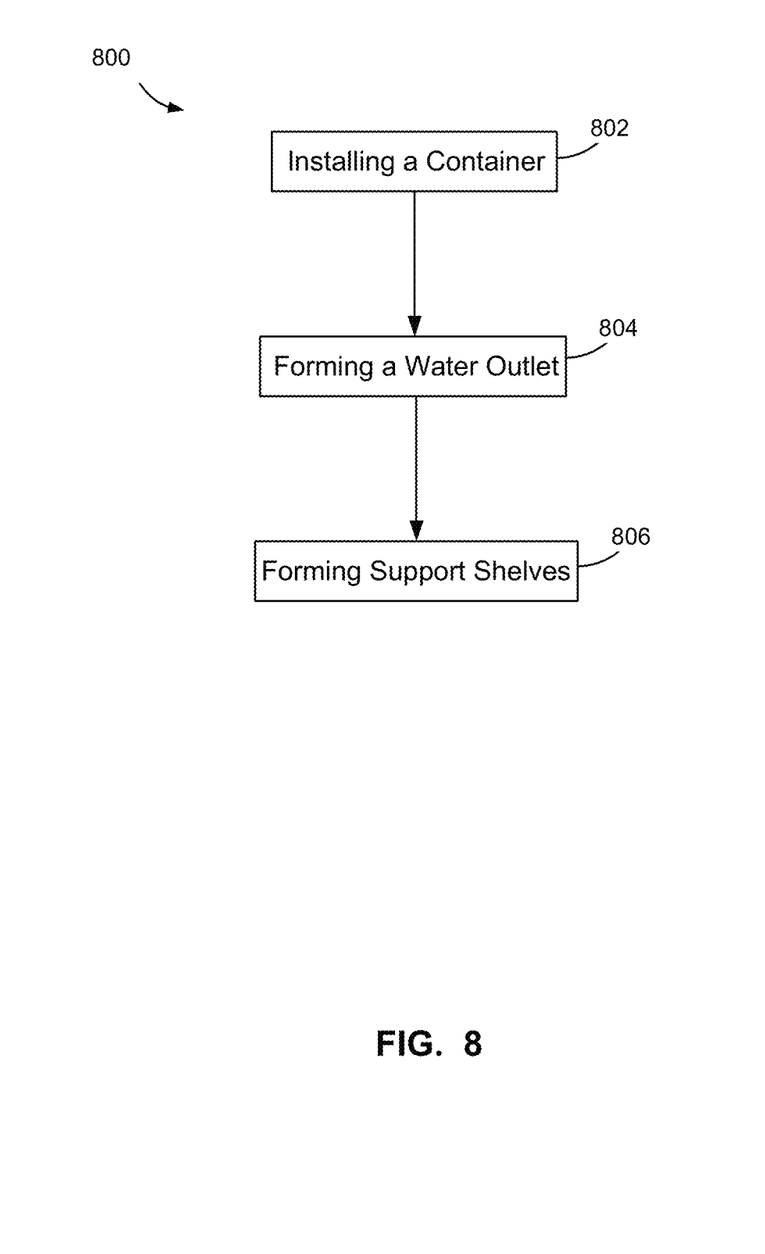
FIG. 8 is a flow chart of a method of installing a communal snake hibernaculum.

Referring to FIG. 8, the exemplary method 800 of constructing a communal snake hibernaculum. The method 800 includes, at step 802, installing a container (e.g., any of the containers disclosed herein) at a hibernaculum site. Step 802 includes installing the container to form a communal chamber with a subterranean water zone at a lower end of the chamber to hold rehydration water and an additional zone above the water zone and positioned to ordinarily remain aerobic, above a water level in the communal chamber, and above freezing such that the additional zone is a snake hibernaculum life zone.

Step 802 further includes forming at least one snake entrance opening into the communal chamber from an exterior of the communal snake hibernaculum to provide snake access to the life zone. Step 802 may include installing the container such that an upper end of the container is above the ground level. Step 802 may include forming an overburden over the upper end of the container.

At step 804, the method 800 includes forming a water outlet opening through a sidewall of the container above the lower end of the chamber and below the life zone to prevent flooding of the life zone. In some examples, a level of groundwater outside the communal chamber fluctuates between a seasonal high level during a first season and a seasonal low level during a second season, and the intake end of the water outlet is above the seasonal low level. In some examples, the intake end of the water outlet is also above the seasonal high level. In some examples, a discharge end of the water outlet is also above the seasonal low level and/or the seasonal high level.

At step 806, the method 800 includes forming a plurality of snake support shelves within the communal chamber at a plurality of vertically-spaced locations between the lower end and an upper end of the container, including at least one snake support shelf in the life zone. In some examples, step 806 includes arranging material within the chamber through an opening in an upper wall of the chamber, such as through the manhole opening 724 of the container 720 of the exemplary hibernaculum of FIG. 7. In some examples, step 806 includes forming the plurality of snake support shelves includes arranging pieces of earthen material loosely within the communal chamber with snake passages therebetween. In some examples, the pieces of earthen material are cinder blocks each having at least one internal cell opening through the block.

The present invention has been described here by way of example only. Various modification and variations may be made to these examples without departing from the scope of the invention, which is limited only by the appended claims.

The invention claimed is:

1. A communal snake hibernaculum, comprising:
   a communal chamber installable at a hibernaculum site with a life zone within the chamber at a depth below a frost line and above a groundwater level, the communal chamber including a sidewall extending between a lower end and an opposing upper end with a water outlet opening through the sidewall between the lower end and the life zone to separate the life zone from a water zone at the lower end of the chamber and prevent flooding of the life zone when the communal chamber is installed at the hibernaculum site;
   a plurality of snake support shelves within the communal chamber at a plurality of positions spaced between the upper and lower ends of the chamber, including at least one snake support shelf within the life zone; and
   a snake entrance opening from an exterior of the communal snake hibernaculum into the communal chamber above the water outlet to provide snake access to the life zone; further comprising a monitoring well extending into the chamber from an exterior of the communal snake hibernaculum, the monitoring well generally vertically extending and configured to allow a sensor to be lowered and raised for user access to the sensor, the sensor operable to sense data including a water level, a temperature, and/or water quality, and log the data and/or transmit the data to a remote location.

2. The communal snake hibernaculum of claim 1, wherein the water outlet includes a passage extending between an intake end opening through the sidewall and a discharge end, the passage provided to carry water away from the hibernaculum when installed at the hibernaculum site.

3. The communal snake hibernaculum of claim 2, installed at the hibernaculum site with the water outlet passage having an above-ground discharge end.

4. The communal snake hibernaculum of claim 1, further comprising a water inlet opening into the communal chamber above the lower end of the communal chamber to supply water to fill the water zone.

5. The communal snake hibernaculum of claim 4, installed at the hibernaculum site with an intake end of the water inlet opening from a seasonally-available water supply to seasonally introduce new water to the communal chamber.

6. The communal snake hibernaculum of claim 1, installed at the hibernaculum site with the bottom end of the communal chamber extending below the ground level to a depth of at least 1 meter.

7. The communal snake hibernaculum of claim 1, installed at the hibernaculum site with the upper end above the ground level and insulated by an overburden.

8. The communal snake hibernaculum of claim 1, wherein at least a plurality of the snake support shelves are formed by a plurality of blocks each having at least one internal cell opening through the block.

9. The communal snake hibernaculum of claim 1, wherein the communal chamber is sized to hold a plurality of snakes and has a volume of at least 7,500 cubic centimeters.

10. The communal snake hibernaculum of claim 1, wherein the communal snake hibernaculum is a multi-species hibernaculum and has a plurality of snake entrances including a first snake entrance sized for a first snake species and a second snake entrance sized for a second snake species, the first snake entrance being a different size than the second snake entrance.

11. A communal snake hibernaculum, comprising:
 a communal chamber having a lower end below a ground level at a hibernaculum site with a water zone at the lower end to hold rehydration water and a snake hibernaculum life zone above the water zone, the communal chamber having a snake entrance providing snake access to the life zone and including snake support shelves within the communal chamber at a plurality of vertically-spaced locations, the snake support shelves including at least one shelf in the life zone; and
 a water outlet opening through a sidewall of the communal chamber above the lower end of the communal chamber and below the life zone to prevent flooding of the life zone, and
 wherein the sidewall is a wall of a container installed at the hibernaculum site; further comprising a monitoring well extending into the chamber from an exterior of the communal snake hibernaculum, the monitoring well generally vertically extending and configured to allow a sensor to be lowered and raised for user access to the sensor, the sensor operable to sense data including a water level, a temperature, and/or water quality, and log the data and/or transmit the data to a remote location.

12. The communal snake hibernaculum of claim 11, wherein the container further comprises a bottom wall, and the sidewall and bottom wall form the lower end below the ground level.

13. The communal snake hibernaculum of claim 12, wherein the container is a plastic drum and the sidewall and bottom wall are part of a unitary body.

14. The communal snake hibernaculum of claim 11, wherein the life zone is above a groundwater level at the hibernaculum site.

15. The communal snake hibernaculum of claim 14, wherein the snake hibernaculum life zone is at a depth that is below a frost line at the hibernaculum site.

16. A method of constructing a communal snake hibernaculum, comprising:
 installing a container at a hibernaculum site to form a communal chamber with a subterranean water zone at a lower end of the chamber to hold rehydration water and an additional zone above the water zone and positioned to ordinarily remain aerobic, above a water level in the communal chamber, and above freezing such that the additional zone is a snake hibernaculum life zone;
 forming at least one snake entrance opening into the communal chamber from an exterior of the communal snake hibernaculum to provide snake access to the life zone;
 forming a water outlet opening through a sidewall of the container above the lower end and below the life zone to prevent flooding of the life zone; and
 forming a plurality of snake support shelves within the communal chamber at a plurality of vertically-spaced locations between the lower end and an upper end of the container, including at least one snake support shelf in the life zone; and forming a monitoring well extending into the chamber from an exterior of the communal snake hibernaculum, the monitoring well generally vertically extending and configured to allow a sensor to be lowered and raised for user access to the sensor, the sensor operable to sense data including a water level, a temperature, and/or water quality, and log the data and/or transmit the data to a remote location.

17. The method of claim 16, wherein installing the container at the hibernaculum site includes installing the container with an upper end of the container above the ground level, the method further comprising forming an overburden over the upper end of the container.

18. The method of claim 16, wherein a level of groundwater outside the communal chamber fluctuates between a seasonal high level during a first season and a seasonal low level during a second season, and the water outlet opens into the communal chamber at a position that is above the seasonal low level.

19. The method of claim 16, wherein forming the plurality of snake support shelves includes arranging cinder blocks within the communal chamber, each cinder block having at least one internal cell opening through the block.

\* \* \* \* \*